United States Patent
Squires

(10) Patent No.: US 10,523,753 B2
(45) Date of Patent: Dec. 31, 2019

(54) BROADCAST DATA OPERATIONS IN DISTRIBUTED FILE SYSTEMS

(71) Applicant: WESTERN DIGITAL TECHNOLOGIES, INC., Irvine, CA (US)

(72) Inventor: Christopher J. Squires, Boulder, CO (US)

(73) Assignee: WESTERN DIGITAL TECHNOLOGIES, INC., Irvine, CA (US)

( * ) Notice: Subject to any disclaimer, the term of this patent is extended or adjusted under 35 U.S.C. 154(b) by 732 days.

(21) Appl. No.: 14/271,435

(22) Filed: May 6, 2014

(65) Prior Publication Data

US 2015/0324387 A1 Nov. 12, 2015

(51) Int. Cl.
   *G06F 16/182* (2019.01)
   *G06F 16/188* (2019.01)
   *H04L 29/08* (2006.01)

(52) U.S. Cl.
   CPC ........ *H04L 67/1097* (2013.01); *G06F 16/188* (2019.01); *G06F 16/1824* (2019.01)

(58) Field of Classification Search
   CPC ......... G06F 17/30864; G06F 17/30067; G06F 17/30545; G06F 17/30595; G06F 16/1824; G06F 16/188; H04L 67/1097
   USPC ........................................ 707/770
   See application file for complete search history.

(56) References Cited

U.S. PATENT DOCUMENTS

| | | | |
|---|---|---|---|
| 6,542,909 B1 | 4/2003 | Tamer et al. | |
| 7,512,673 B2 | 3/2009 | Miloushev et al. | |
| 7,562,110 B2 | 7/2009 | Miloushev et al. | |
| 7,685,126 B2 | 3/2010 | Patel et al. | |
| 7,987,323 B2* | 7/2011 | Coatney | G06F 3/0619 709/200 |
| 8,296,398 B2 | 10/2012 | Lacapra et al. | |
| 8,417,681 B1* | 4/2013 | Miloushev | G06F 17/30067 707/704 |
| 9,166,878 B1* | 10/2015 | Cook | H04L 41/08 |
| 2004/0003182 A1* | 1/2004 | Cypher | G06F 12/0815 711/141 |
| 2004/0088297 A1* | 5/2004 | Coates | G06F 3/0613 |

(Continued)

FOREIGN PATENT DOCUMENTS

WO 2004036408 A2 4/2004

OTHER PUBLICATIONS

Tajo, et al., A Distributed Data Warehouse System on Large Clusters, In Proceedings of 2013 IEEE 29th International Conference, Apr. 8-12, 2013.

*Primary Examiner* — Michael Pham
(74) *Attorney, Agent, or Firm* — Foley & Lardner LLP

(57) ABSTRACT

Systems, methods, and software for distributed file systems (DFS) are provided herein. In one example, the DFS is operable to respond to a write operation for the DFS by transferring a write command to a selected storage system for broadcast of the write command to a plurality of storage devices associated with a network switch fabric of the selected storage system. Further operations of the DFS can include, responsive to a read operation for the DFS, transferring a read command to a selected storage system for broadcast of the read command to a plurality of storage devices associated with a network switch fabric of the selected storage system.

14 Claims, 6 Drawing Sheets

(56) References Cited

U.S. PATENT DOCUMENTS

| | | | |
|---|---|---|---|
| 2007/0024919 A1* | 2/2007 | Wong | G06F 9/5027 |
| | | | 358/403 |
| 2007/0098397 A1* | 5/2007 | Chen | H04N 5/232 |
| | | | 396/429 |
| 2007/0282868 A1* | 12/2007 | Wanigasekara-Mohotti | ............ |
| | | | G06F 17/30067 |
| 2009/0094252 A1* | 4/2009 | Wong | H04L 67/06 |
| 2015/0089038 A1* | 3/2015 | Gayles | H04L 67/22 |
| | | | 709/223 |

* cited by examiner

BROADCAST DATA OPERATIONS IN DISTRIBUTED FILE SYSTEMS

TECHNICAL FIELD

Aspects of the disclosure are related to the field of digital data storage systems.

TECHNICAL BACKGROUND

Computer and network systems such as personal computers, workstations, and server systems, typically include data storage systems for storing and retrieving data. These data storage systems can include data storage devices, such as hard disk drives, solid state storage devices, tape storage devices, and other mass storage devices.

As storage systems have evolved, cloud storage systems have emerged as an alternative to local storage systems. Cloud storage systems, such as distributed file systems (DFS), can distribute storage of data across many data storage centers or data storage systems, abstracting the physical location of data from end users or client devices. Thus, a cloud storage system can have a multitude of data storage devices distributed over one or more data centers which may be physically distant.

Various packet network protocols, such as Internet Protocol (IP), can be used by a client device to interface with the DFS. In contrast, typical data storage devices rely upon block level data storage interfaces, such as Serial ATA (SATA), or Serial Attached SCSI (SAS), among others. Integrating these data storage devices and associated data storage interfaces into DFS environments can present challenges for DFS management nodes to track where data is allocated among individual data storage devices.

Overview

To provide enhanced operation of distributed file systems (DFS), various systems, methods, apparatuses, and software are provided herein. In some examples, these systems, methods, apparatuses, and software can provide for operation of a DFS that includes, responsive to a write operation for the DFS, transfer a write command to a first selected storage system of a plurality of storage systems for broadcast of the write command to a plurality of storage devices associated with a network switch fabric of the first selected storage system, where a first storage device of the first selected storage system accepts the write command and stores write data associated with the write operation to a storage medium of the first storage device. Further operations of the DFS can include, responsive to a read operation for the DFS, transferring a read command to a second selected storage system for broadcast of the read command to the storage devices associated with a network switch fabric of the second selected storage system, where a second storage device of the second selected storage system accepts the read command and transfers read data associated with the read operation from a storage medium of the second storage device.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Distributed data storage services have emerged as an alternative to local storage systems, such as hard drives in business servers or desktop computers. These distribute data storage systems, such as cloud storage systems, can distribute storage of data across many data storage centers or data storage systems, abstracting the physical location of data from end users or client devices. The data can be included in data files or can be included in data objects. Although the term 'file' is used herein, it should be understood that the operations can also apply to data objects.

In some examples, a specialized file system is employed for file handling operations of the distributed data storage service. Example distributed file systems (DFS) include Network File System (NFS) and Google File System (GFS), which employ packet networking protocols for file handling operations to present a client device with a file system view that parallels a local storage device. In many examples of distributed file systems, one or more interface systems are employed as an intermediary between a client device and a storage network. These interface systems can include metadata servers, control nodes, or other systems. A client device can access and interact with the distributed file system over a terminal interface, web browser interface, or specialized application interface.

Figure 1:
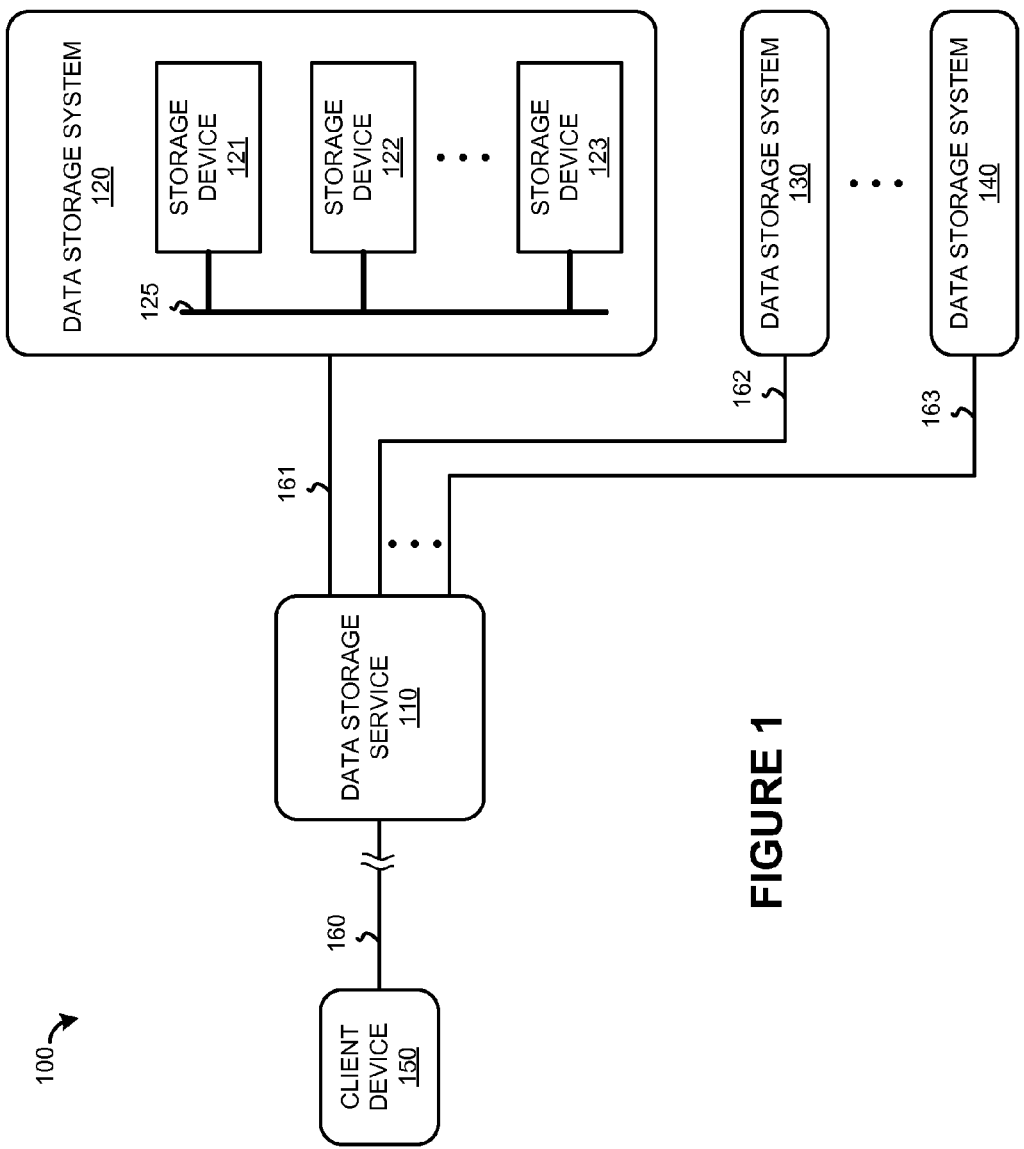
FIG. 1 is a system diagram illustrating a computing system.

As a first example employing a distributed file system, FIG. 1 is presented. FIG. 1 is a system diagram illustrating computing system 100. Computing system 100 includes data storage service 110, data storage systems 120, 130, and 140, and client device 150. Client device 150 and data storage service 110 communicate over link 160. Data storage service 110 and data storage system 120 communicate over link 161. Data storage service 110 and data storage system 130 communicate over link 162. Data storage service 110 and data storage system 140 communicate over link 163. Although three data storage systems are included in FIG. 1, a different number of data storage systems can instead be included.

Data storage system 120 includes further elements in FIG. 1. Similar elements can be included in any of data storage system 130 and data storage system 140. Data storage system 120 includes one or more data storage devices 121-123. Each of data storage devices 121-123 communicate over network switch 125. Further elements can be included in data storage system 120, such as controllers, interface nodes, network routers, and the like, which can be employed to communicate over at least link 161.

In operation, client device 150 issues file handling operations to data storage service 110. These file handling operations can include read, write, copy, move, delete, traversal of metadata, or other file handling operations. Data storage service 110 receives these file handling operations, along with any associated file data, and employs data storage systems 120, 130, and 140 to handle data associated with the file handling operations. Also, although client device 150 and data storage service 110 are shown as separate entities in FIG. 1, in other examples these elements can be included in the same entities or equipment. Furthermore, data storage service 110 can comprise a virtual device run by a computing system, such as client device 150.

Figure 2:
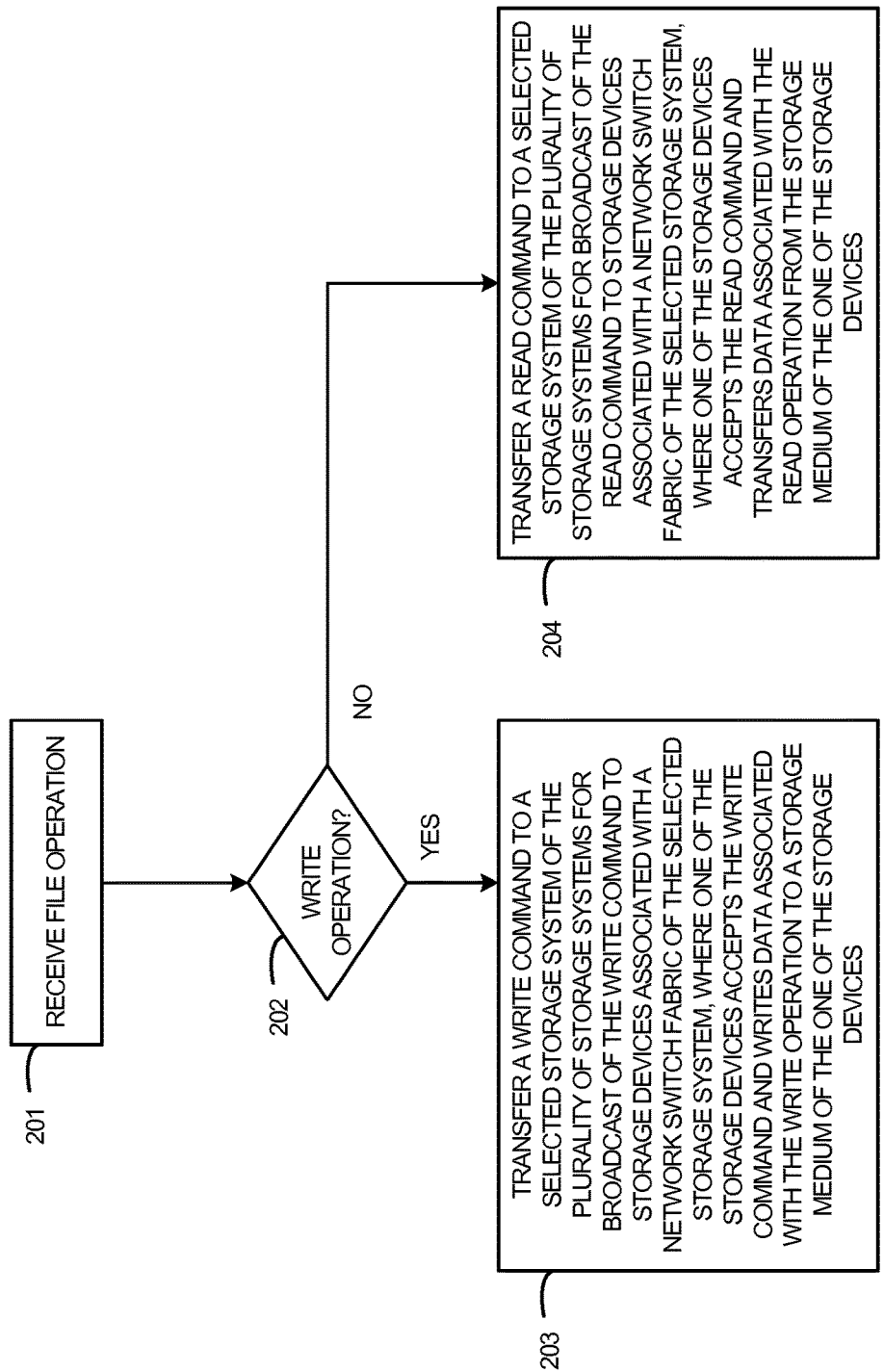
FIG. 2 is a flow diagram illustrating a method of operation of a data storage service.

As a further example of operation of FIG. 1, FIG. 2 is presented. FIG. 2 is a flow diagram illustrating a method of operation of data storage service 110. The operations of FIG. 2 are referenced below parenthetically. In FIG. 2, data storage service 110 receives (201) a file operation. Although the file operation can include any file or data handling operation, such as those mentioned above, in this example only file reads and file writes will be discussed. In this example, data storage service 110 can act as an interface between a client device and various data storage systems of a distributed file system. Data storage service 110 can present a user interface to client device 150, and client device 150 can engage in file handling operations, such as file writes and file reads. In some examples, data storage service 110 presents a file system view of a distributed file system to client device 150.

FIG. 1, as mentioned above, includes a plurality of data storage systems, namely data storage systems 120, 130, and 140. Each of these data storage systems can communicate with data storage service 110, and are configured to store and retrieve data of one or more DFSs managed by data storage service 110. Also, as shown in FIG. 1, each data storage system includes a plurality of data storage devices coupled via a network switch fabric.

If the file operation is a write operation (202), then data storage service 110 transfers (203) a write command to a selected data storage system of the plurality of data storage systems for broadcast of the write command to the data storage devices associated with the network switch fabric of the selected data storage system, where one of the data storage devices accepts the write command and writes data associated with the write operation to a storage medium of the one of the data storage devices. The write operation can be accompanied by data, such as a file, to be written into the DFS by data storage service 110. The write operation can also include an identifier for the data, such as a file name or metadata tag which can be used to identify the data for later retrieval.

Once the write operation is received, a write command can be generated by data storage service 110. The write command can include an identifier of a destination data storage system, such as an identifier for one of data storage systems 120, 130, or 140. However, the write command does not identify a unique destination data storage device, such as an identifier of any of data storage devices 121-123. Once a data storage system is selected, the write command is transferred to the selected data storage system, such as over link 161 to data storage system 120. The write command can also include the file data to be written, along with any associated metadata or file identifiers.

The write command is then received by data storage system 120, and is broadcast by network switch 125 for receipt by data storage devices 121-123. Data storage devices 121-123 receive the write command. Any of data storage devices 121-123 can responsively accept the write command and write the associated data for storage on a storage medium of the data storage device. In examples where more than one of data storage devices 121-123 accept the write command, then a process can be established to inform one of data storage devices 121-123 that data associated with the write command should be committed to the storage medium. It should be noted that the specific data storage device for the write command and associated data is not predetermined in this example, and is instead determined based in part on which of data storage devices 121-123 accepts the write command.

Each of data storage devices 121-123 can use various criteria for determining whether or not to accept the write command, even though all of data storage devices 121-123 receive the write command. For example, a first of data storage devices 121-123 to acknowledge the write command can be considered to have accepted the write command. In other examples, one of data storage devices 121-123 that has an activity level that falls below an activity threshold can accept the write command. In yet other examples, one of data storage devices 121-123 that falls below a used capacity level can accept the write command.

If the file operation is a read operation, then data storage service 110 transfers (204) a read command to a selected data storage system of the plurality of data storage systems for broadcast of the read command to the data storage devices associated with a network switch fabric of the selected data storage system, where one of the data storage devices accepts the read command and transfers data associated with the read operation from the storage medium of the one of the data storage devices. The read operation can be accompanied by an identifier, such as a file identifier which uniquely identifies the file or data to be retrieved. The file identifier can include a file name or other metadata which can be used to identify the data previously written.

Once the read operation is received, a read command can be generated by data storage service 110. The read command can include an identifier of a destination data storage system that originally stored the data associated with the read operation, such as an identifier for one of data storage systems 120, 130, or 140. However, the read command does not identify a unique data storage device, such as an identifier of any of data storage devices 121-123. Once a data storage system is selected, the read command is transferred to the selected data storage system, such as over link 161 to data storage system 120. The read command can also include any associated metadata or file identifiers.

The read command is then received by data storage system 120, and is broadcast by network switch 125 for receipt by data storage devices 121-123. Data storage devices 121-123 receive the read command. Each of data storage devices 121-123 monitors the read command and determines if the associated data is stored on a storage medium associated with the data storage device. If any of data storage devices 121-123 contains the data referenced in the read command, then that data storage device 121-123 responds to the read command by retrieving the associated data from a storage medium and transferring the data for receipt by a destination system. It should be noted that the specific data storage device for the read command is not predetermined in this example, and is instead determined based in part on which of data storage devices 121-123 accepts and responds to the read command.

Returning to the elements of FIG. 1, data storage service 110 comprises one or more computing systems that execute software or firmware for operating distributed file system services as discussed herein. In some examples, data storage service 110 comprises a distributed file system management node, and can include user interfaces, data interfaces, and network interfaces for receiving file handling operations from client devices. Various data structures can be maintained by data storage service 110 for correlating files or data to data storage system identifiers, such as network addresses. In some examples, data storage service 110 comprises a virtual machine executed on one or more computing systems.

Each of data storage systems 120, 130, and 140 comprises one or more data storage devices, structural support or enclosure elements, and network switch fabric equipment. In some examples, data storage systems 120, 130, and 140 comprise management nodes, such as processing systems to coordinate and handle traffic routing between external systems and the associated data storage devices. In yet further examples, data storage systems 120, 130, and 140 comprise network router, bridge, or switch equipment and associated network links for exchanging network traffic between data storage devices and external systems, such as data storage service 110 or client device 150. Data storage systems 120, 130, and 140 can each comprise a data storage rack system, with many data storage devices mounted therein, along with any associated power, cabling, cooling, and monitoring equipment.

Each of data storage devices 121-123 comprises networked data storage devices. Data storage devices 121-123 communicate with external systems over a network interface, such as an Ethernet or IP interface, and do not communicate over a conventional block-level storage interface with external systems. These conventional block-level storage interfaces can include SAS, serial ATA, Fiber Channel, Integrated Drive Electronics (IDE), Universal Serial Bus (USB), or other storage interfaces. Data storage devices 121-123 can each comprise one or more network interface card (NIC) equipment, media access control (MAC) equipment, processing systems, and at least one storage medium. In some examples, the storage medium comprises magnetic rotating media, although flash media, solid state media, phase change media, optical storage media, or other storage media can be employed.

Client device 150 comprises one or more computing systems, and can include a user interface for presenting a file system view to a user of client device 150. In some examples, client device 150 comprises a web browser for displaying the file system view and accepting file handling operations from a user of client device 150. In other examples, client device 150 includes specialized applications or software drivers for presenting the distributed file system of data storage service 110 to a user, such as drive mapping software, or a discrete file handling application. Client device 150 can also include authentication software for authenticating a user of client device 150 to access data handled by data storage service 110.

Links 160-163 each use metal, glass, optical, air, space, or some other material as the transport media. Links 160-163 can each use various network communication protocols, such as Ethernet, Internet Protocol (IP), Time Division Multiplex (TDM), asynchronous transfer mode (ATM), synchronous optical networking (SONET), hybrid fiber-coax (HFC), packet communication signaling, wireless communications, or some other communication format, including combinations, improvements, or variations thereof. Links 160-163 can each be a direct link or can include intermediate networks, systems, or devices, and can include a logical network link transported over multiple physical links Links 160-163 can each include many different signals sharing the same associated link, as represented by the associated lines in FIG. 1, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

Figure 3:
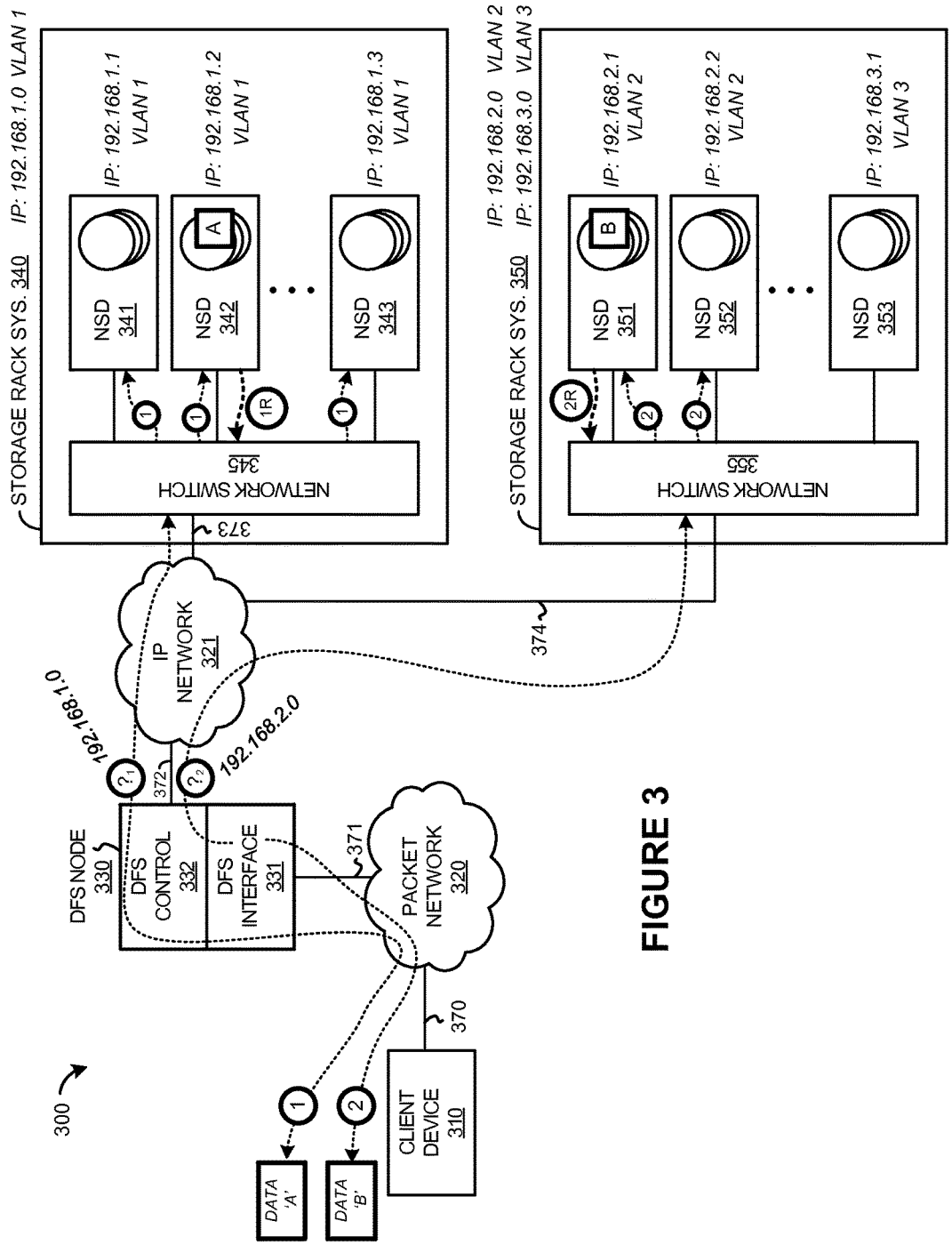
FIG. 3 is a system diagram illustrating a computing system.

As another example employing a distributed file system, FIG. 3 is presented. FIG. 3 is a system diagram illustrating computing system 300. Computing system 300 includes client device 310, packet network 320, distributed file system (DFS) node 330, IP network 321, storage rack system 340, and storage rack system 350. Client device 310 communicates with DFS node 330 over packet links 370-371 and packet network 320. DFS node 330 communicates with storage rack system 340 over links 372-373 and IP network 321. DFS node 330 communicates with storage rack system 350 over links 372, 374 and IP network 321.

Client device 310 comprises a computing system in this example, and executes software for interacting with DFS interface 331 of DFS node 330. Client device 310 can issue file handling operations, such as file read, file write, metadata, traversal, and other file handling operations for storing, retrieving, and handling file data stored by DFS node 330. Client device 310 can issue these file handling operations by interacting with DFS interface 331. Although only one client device is shown in FIG. 3, it should be understood that any number of client devices can be included.

DFS interface 331 can include one or more processing systems to provide a user interface, application interface, or client interface for receiving and acknowledging file handling operations. For example, DFS interface can comprise a hypertext markup language (HTTP) interface that allows a client device to traverse a DFS file structure and issue file handling operations. In another example, DFS interface 331 can comprise a protocol interface or terminal interface for receiving file handling operations from client device 310. In yet another example, DFS interface 331 provides an application programming interface (API) for receiving file handling operations issued by client devices. DFS interface 311 can responsively return data requested by client device 310.

DFS control 332 can include one or more processing systems for handling the transfer for read and write commands to storage systems, such as storage rack systems 340 and 350. In some examples, DFS control 332 translates file handling operations issued by client device 310 into file handling commands for transfer to storage systems. DFS control 332 can include one or more data structures that correlate files to storage systems. In one example, a data structure correlates file names, or other file identifiers, to a particular storage rack system. In another example, a data structure correlates a particular client device, such as a username, customer identifier, client type, and the like, to a particular storage system. This correlation can include an IP address for storage and retrieval of data or for other file handling operations, where the IP address is for a storage rack system, or for a plurality of network storage devices, among other addresses.

Packet network 320 and IP network 321 both comprise packet networks. Packet network 320 can employ any packet networking protocol, such as Ethernet, IP, ATM, and the like, including combinations thereof. In other examples, elements 320-321 can comprise data storage links, such as Infiniband, Fibre Channel, PCI Express, or Serial ATA. In this example, IP network 321 includes an IP network for handling routing of IP addressable traffic to ones of storage rack systems 340 and 350. Accordingly, links 370-374 comprise packet networking links.

Storage rack systems 340 and 350 each include one or more network storage devices (NSD) and one or more network switches. In FIG. 3, storage rack system 340 includes NSDs 341-343 and network switch 345, and storage rack system 350 includes NSDs 351-353 and network switch 355. Various network links and other routing, power, cooling, and structural elements can also be included in any of storage rack systems 340 and 350.

Each of the NSDs in each storage rack system has at least one IP address associated therewith. These IP addresses can be used to identify the associated NSD on an IP network. In some examples, the IP addresses of the NSDs are translated network addresses, such as done in network address translation schemes. Additionally, another IP address is employed to communicate with a plurality of NSDs in each storage rack system. In a first example, storage rack 340 is organized into a single virtual local area network (VLAN 1) with an IP address employed (192.168.1.0) as a broadcast address for the devices associated with the VLAN. When communications are received by network switch 345, or other elements of storage rack system 340, the communications are broadcast over the VLAN for receipt by any connected devices, such as NSD 341-343. In a second example, storage rack 350 is organized into two virtual local area networks (VLAN 2 and VLAN 3) with a first IP address employed (192.168.2.0) as a broadcast address for the devices associated with VLAN 2 and a second IP address employed (192.168.3.0) as a broadcast address associated with VLAN 3. When communications are received by network switch 355, or other elements of storage rack system 350, the communications are broadcast over the associated VLAN for receipt by any connected devices, such as ones of NSD 351-353. In further examples, a VLAN could be configured to span multiple storage rack systems, with an associated network address used as a broadcast address for the VLAN.

Figure 4:
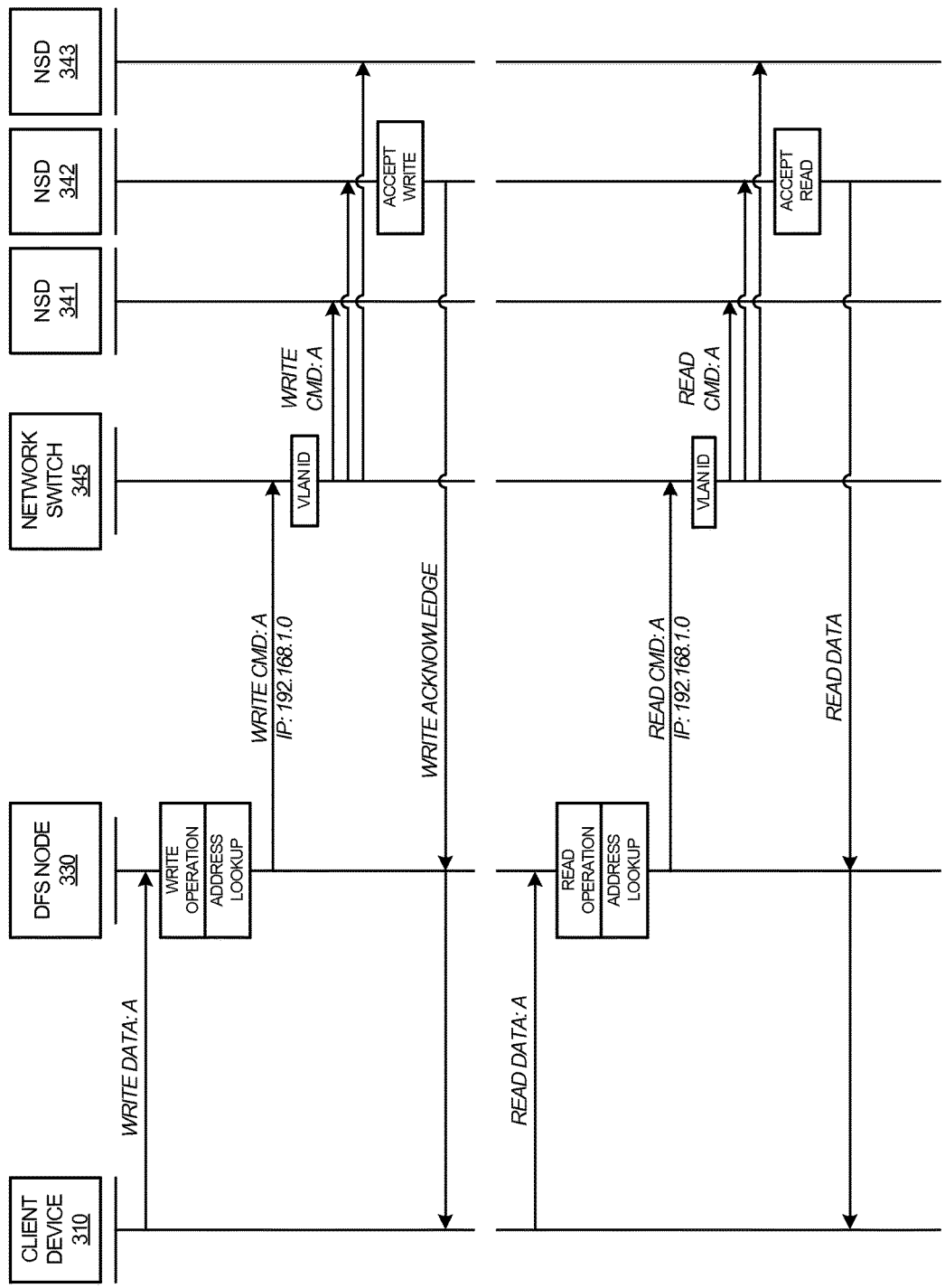
FIG. 4 is a sequence diagram illustrating a method of operation of a distributed file system.

To illustrate a first example operation of the elements of FIG. 3, FIG. 4 is presented. FIG. 4 is a sequence diagram illustrating a method of operation of a distributed file system. Both a write operation and a read operation are illustrated in FIG. 4, and the write operation will be discussed first. In FIG. 3, the write command pathways and read command pathways are illustrated by operation '1.'

In FIG. 4, client device 310 issues a write operation to DFS node 330 accompanied by write data 'A' for storage by the DFS. DFS node 330 identifies the operation as a write operation and performs an address lookup for the write operation. The address lookup references a data structure to identify a network address to issue a write command for storage of the write data. In this example, the network address is identified as 192.168.1.0 which is associated with VLAN 1 of storage rack system 340. Responsive to the write operation issued by client device 310, DFS node 330 issues a write command to the network address identified.

The write operation received by DFS interface 331 from client device 310 can comprise one or more packets which includes data to be stored in the DFS and any associated metadata, file identities, or other information associated with a DFS write operation. The write command issued by DFS control 332 of DFS node 330 can comprise one or more IP packets which includes data to be stored in a storage rack system and any associated metadata, file identities, or other information. In some examples, the write operation is encapsulated by another packet with an associated IP address of the selected storage rack system, while in other examples, further instructions or information is added by DFS control 332.

Network switch 345 receives the write command that was transferred by DFS control 332 and determines a destination for the write command. Since the write command is addressed to a broadcast address for VLAN 1 in this example, network switch identifies a VLAN over which to broadcast the write command. Responsively, network switch 345 broadcasts the write command to all devices on VLAN 1, namely NSD 341-343.

NSDs 341-343 all receive the write command. At this point, the specific NSD that will accept the write command and store the data on an associated storage medium has not been pre-determined. Instead, one or more of NSDs 341-343 can accept the write command and store the associated data on a storage medium. Various ways for a specific NSD to accept the write request can be established.

In a first example, any number of NSDs can respond to the write request with an acknowledgement message, and an NSD is selected from among the responders. The selection process can include a random process, a hashed selection process, or a round-robin process, among other selection processes. In some examples, DFS control 332 or client device 310 selects the NSD from among the responders. In another example, a separate selection module is included in one or more storage rack systems to perform the selection. In yet other examples, network switch 345 can perform the selection. Also, one or more NSDs of the associated VLAN can instead accept the write request, and the associated NSDs of the VLAN that accepted the write request can communicate with each other to determine which NSD should commit the write data.

In this example, DFS control 332 selects the NSD and informs the selected NSD that the write command should be committed, and informs the other NSDs that the write command should not be committed and that the write command should be discarded. Once a selected NSD receives a commit message from the network switch, then the write data can be committed to a storage medium. In the example shown in FIG. 3, NSD 342 commits write data 'A' to a storage medium of NSD 342, as seen by operation '1R.'

In a second example, instead of network switch 345 or elements of storage rack system 340 selecting an NSD that responds to the write command, the one or more NSDs that accept the write command can issue an acceptance message to DFS control 332. DFS control 332 can then select a specific NSD based on the various selection methods described in the first example above, and inform the selected NSD to commit the write command and associated write data to a storage medium.

In a third example, network switch 345 receives the write command that identifies the broadcast IP address, and network switch 345 selects an NSD from among the many NSDs on the VLAN subnet identified by the IP address to transfer the write command. A subnet mask or classless "slash" notation can be employed along with an IP address to specify a plurality of NSDs.

When client device 310 desires to read data stored in the DFS, a read operation can be issued by client device 310 for receipt by DFS interface 331. Similar to the write operation, DFS control can identify an IP address associated with a VLAN or storage rack system to handle a read command associated with the read operation. The read command can include an identifier for data or a file to be retrieved, such as a file name, directory path, metadata identifier, among other identifiers. In this example, DFS control 332 identifies an IP address of 192.168.1.0 as the storage rack system that originally stored the write data 'A' and issues a corresponding read command to that IP address.

Network switch 345 receives the read command, identifies a VLAN over which to broadcast the read command based on at least the IP address included in the read command, and broadcasts the read command over the VLAN. NSDs 341-343 all receive the read command. At this point, the specific NSD that will accept the read command and retrieve the data from an associated storage medium has not been indicated by the read command. Instead, one of NSDs 341-343 can accept the read command and retrieve the associated data from a storage medium.

In this example, NSD 342 originally stored data 'A' and thus NSD 342 will accept the read command. NSDs 341-343 can process the read command to determine the file or data identifier included therewith, and determine if the NSD had previously stored the data identified in the read command. NSD 342 can responsively transfer data 'A' for delivery to a destination address once retrieved from the storage medium. The destination address can be DFS node 330, and then DFS node 330 can transfer the read data for delivery to client device 310. The destination address can instead be client device 310, and NSD 342 can transfer the read data for delivery to client device 310. In further examples, the read command can include instructions that indicate a network address to transfer the read data, such as a destination node identified in the read operation. The destination node can be client device 310, or other destinations.

Figure 5:
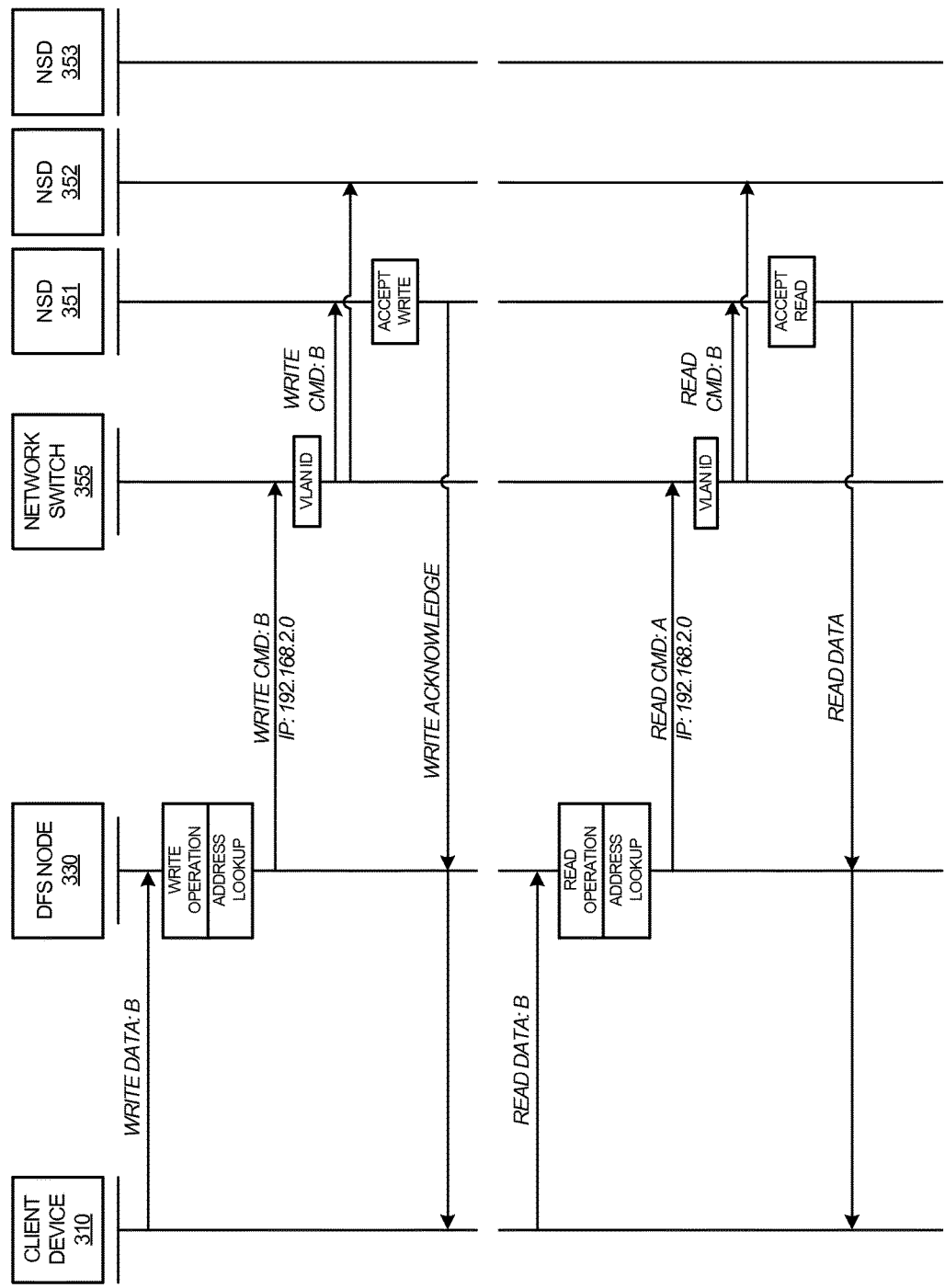
FIG. 5 is a sequence diagram illustrating a method of operation of a distributed file system.

To illustrate a second example operation of the elements of FIG. 3, FIG. 5 is presented. FIG. 5 is a sequence diagram illustrating a method of operation of a distributed file system. Both a write operation and a read operation are illustrated in FIG. 5, and the write operation will be discussed first. In FIG. 3, the write command pathways and read command pathways are illustrated by operation '2.'

In FIG. 5, client device 310 issues a write operation to DFS node 330 accompanied by write data 'B' for storage by the DFS. DFS node 330 identifies the operation as a write operation and performs an address lookup for the write operation. The address lookup references a data structure to identify a network address to issue a write command for storage of the write data. In this example, the network address is identified as 192.168.2.0 which is associated with VLAN 2 of storage rack system 350. Responsive to the write operation issued by client device 310, DFS node 330 issues a write command to the network address identified.

The write operation received by DFS interface 331 from client device 310 can comprise one or more packets which include data to be stored in the DFS and any associated metadata, file identities, or other information associated with a DFS write operation. The write command issued by DFS control 332 of DFS node 330 can comprise one or more IP packets which includes data to be stored in a storage rack system and any associated metadata, file identities, or other information. In some examples, the write operation is encapsulated by another packet with an associated IP address of the selected storage rack system, while in other examples, further instructions or information is added by DFS control 332.

Network switch 355 receives the write command that was transferred by DFS control 332 and determines a destination for the write command. Since the write command is addressed to a broadcast address for VLAN 2 in this example, network switch identifies a VLAN over which to broadcast the write command. Responsively, network switch 355 broadcasts the write command to all devices on VLAN 2, namely NSD 351-352. Since NSD 353 is associated with VLAN 3 in this example, the write command will not be broadcast by network switch 355 over VLAN 3.

NSDs 351-352 all receive the write command. At this point, the specific NSD that will accept the write command and store the data on an associated storage medium has not been pre-determined. Instead, one or more of NSDs 351-352 can accept the write command and store the associated data on a storage medium. Various ways for a specific NSD to accept the write request can be established.

In a first example, any number of NSDs can respond to the write request with an acknowledgement message, and network switch 355 or other systems in storage rack 355 can select an NSD from among the responders. The selection process can include a random process, a hashed selection process, or a round-robin process, among other selection processes. Network switch 355 can inform the selected NSD that the write command should be committed, and inform the other NSDs that the write command should not be committed and that the write command should be discarded. Once a selected NSD receives a commit message from the network switch, then the write data can be committed to a storage medium. In the example shown in FIG. 3, NSD 351 commits write data 'B' to a storage medium of NSD 351, as seen by operation '2R.'

In a second example, instead of network switch 355 or elements of storage rack system 350 selecting an NSD that responds to the write command, the one or more NSDs that accept the write command can issue an acceptance message to DFS control 332. DFS control 332 can then select a specific NSD based on the various selection methods described in the first example above, and inform the selected NSD to commit the write command and associated write data to a storage medium.

In a third example, network switch 355 receives the write command that identifies the broadcast IP address, and network switch 355 selects an NSD from among the many NSDs on the VLAN subnet identified by the IP address to transfer the write command. A subnet mask or classless "slash" notation can be employed along with an IP address to specify a plurality of NSDs.

When client device 310 desires to read data stored in the DFS, a read operation can be issued by client device 310 for receipt by DFS interface 331. Similar to the write operation, DFS control can identify an IP address associated with a VLAN or storage rack system to handle a read command associated with the read operation. The read command can include an identifier for data or a file to be retrieved, such as a file name, directory path, metadata identifier, among other identifiers. In this example, DFS control 332 identifies an IP address of 192.168.2.0 as the storage rack system that originally stored the write data 'B' and issues a corresponding read command to that IP address.

Network switch 355 receives the read command, identifies a VLAN over which to broadcast the read command based on at least the IP address included in the read command, and broadcasts the read command over the VLAN. NSDs 351-352 of VLAN 1 all receive the read command. At this point, the specific NSD that will accept the read command and retrieve the data from an associated storage medium has not been indicated by the read command. Instead, one of NSDs 351-352 can accept the read command and retrieve the associated data from a storage medium.

In this example, NSD 351 originally stored data 'B' and thus NSD 351 will accept the read command. NSDs 351-352 can process the read command to determine the file or data identifier included therewith, and determine if the NSD had previously stored the data identified in the read command. NSD 351 can responsively transfer data B' for delivery to a destination address once retrieved from the storage medium. The destination address can be DFS node 330, and then DFS node 330 can transfer the read data for delivery to client device 310. The destination address can instead be client device 310, and NSD 351 can transfer the read data for delivery to client device 310. In further examples, the read command can include instructions that indicate a network address to transfer the read data, such as a destination node identified in the read operation. The destination node can be client device 310, or other destinations.

Figure 6:
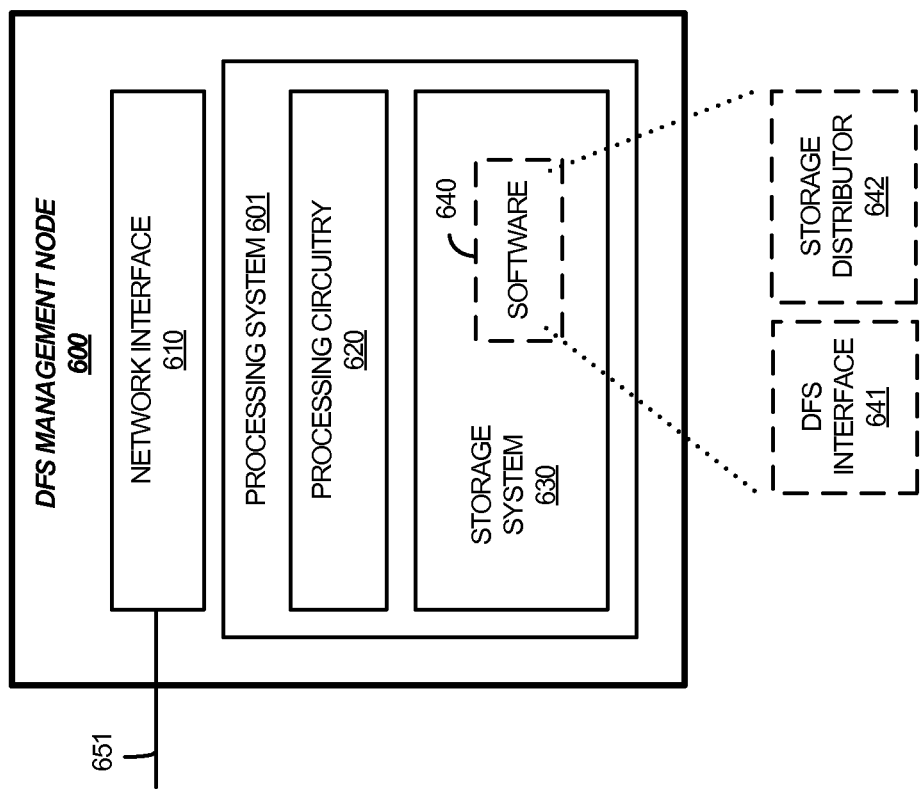
FIG. 6 is a block diagram illustrating a distributed file system management node.

FIG. 6 is a block diagram illustrating distributed file system management node 600. DFS management node 600 can represent elements of data storage service 110 of FIG. 1 or elements of DFS node 330 of FIG. 3, although variations are possible. DFS management node 600 includes network interface 610 and processing system 601. Processing system 601 includes processing circuitry 620 and storage system 630. The elements of DFS management node 600 are communicatively coupled over one or more communication links, which can include busses, which can comprise busses, discrete connections, network links, software interfaces, or other circuitry. DFS management node 600 can be distributed or consolidated among equipment or circuitry that together forms the elements of DFS management node 600. DFS management node 600 can optionally include additional devices, features, or functionality not discussed here for purposes of brevity.

Network interface 610 includes one or more network interfaces for communicating over communication networks, such as the IP networks or packet networks discussed herein. The network interfaces can include an Ethernet interface, IP interface, or other local or wide area network communication interfaces which can communicate over a communication link. Examples of network interface 610 include network interface card equipment, transceivers, modems, and other communication circuitry. In this example, network interface 610 communicates over network links 651. Network links 651 can include any communication network links as described herein.

Processing circuitry 620 can comprise one or more microprocessors and other circuitry that retrieves and executes software 640 from storage system 630. Processing circuitry 620 can be implemented within a single processing device but can also be distributed across multiple processing devices or sub-systems that cooperate in executing program instructions. Examples of processing circuitry 620 include general purpose central processing units, application specific processors, and logic devices, as well as any other type of processing device, combinations, or variations thereof.

Storage system 630 can comprise any non-transitory computer readable storage media readable by processing circuitry 620 and capable of storing software 640. Storage system 630 can include volatile and nonvolatile, removable and non-removable media implemented in any method or technology for storage of information, such as computer readable instructions, data structures, program modules, or other data. In addition to storage media, in some implementations storage system 630 can also include communication media over which software 640 can be communicated. Storage system 630 can be implemented as a single storage device but can also be implemented across multiple storage devices or sub-systems co-located or distributed relative to each other. Storage system 630 can comprise additional elements, such as a controller, capable of communicating with processing circuitry 620. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media.

Software 640 can be implemented in program instructions and among other functions can, when executed by DFS management node 600 in general or processing circuitry 620 in particular, direct DFS management node 600 or processing circuitry 620 to responsive to a write operation for a DFS, transfer a write command to a first selected storage system of a plurality of storage systems for broadcast of the write command to a plurality of storage devices associated with a network switch fabric of the first selected storage system, where a first storage device of the first selected storage system accepts the write command and stores write data associated with the write operation to a storage medium of the first storage device. Further instructions when executed by DFS management node 600 in general or processing circuitry 620 in particular, direct DFS management node 600 or processing circuitry 620 to, responsive to a read operation for the DFS, transfer a read command to a second selected storage system for broadcast of the read command to the storage devices associated with a network switch fabric of the second selected storage system, where a second storage device of the second selected storage system accepts the read command and transfers read data associated with the read operation from a storage medium of the second storage device, among other operations. Software 640 can include additional processes, programs, or components, such as operating system software, database software, or application software. Software 640 can also comprise firmware or some other form of machine-readable processing instructions executable by processing circuitry 620.

In at least one implementation, the program instructions can include first program instructions that direct processing circuitry 620 to, responsive to a write operation for a DFS, transfer a write command to a first selected storage system of a plurality of storage systems for broadcast of the write command to a plurality of storage devices associated with a network switch fabric of the first selected storage system, where a first storage device of the first selected storage system accepts the write command and stores write data associated with the write operation to a storage medium of the first storage device. The program instructions can include further program instructions that direct processing circuitry 620 to, responsive to a read operation for the DFS, transfer a read command to a second selected storage system for broadcast of the read command to the storage devices associated with a network switch fabric of the second selected storage system, where a second storage device of the second selected storage system accepts the read command and transfers read data associated with the read operation from a storage medium of the second storage device, among other operations.

In another implementation, the program instructions can include DFS interface module 641 and storage distributor module 642. DFS interface module 641 can receive file handling operations from client devices, present user interfaces for client devices to engage in file handling operations, accept write data for transfer to storage systems, and transfer read data retrieved from storage systems, among other operations. Storage distributor module 642 can determine write commands from write operations, identify network addresses of storage systems for storage of DFS data, determine read commands from read operations, identify network addresses of storage systems for retrieval of DFS data, and exchange write/read operations with storage systems, among other options.

In general, software 640 can, when loaded into processing circuitry 620 and executed, transform processing circuitry 620 overall from a general-purpose computing system into a special-purpose computing system customized to, responsive to a write operation for a DFS, transfer a write command to a first selected storage system of a plurality of storage systems for broadcast of the write command to a plurality of storage devices associated with a network switch fabric of the first selected storage system, where a first storage device of the first selected storage system accepts the write command and stores write data associated with the write operation to a storage medium of the first storage device. Further software when loaded into processing circuitry 620 and executed, transform processing circuitry 620 overall from a general-purpose computing system into a special-purpose computing system customized to, responsive to a read operation for the DFS, transfer a read command to a second selected storage system for broadcast of the read command to the storage devices associated with a network switch fabric of the second selected storage system, where a second storage device of the second selected storage system accepts the read command and transfers read data associated with the read operation from a storage medium of the second storage device, among other operations. Encoding software 640 on storage system 630 can transform the physical structure of storage system 630. The specific transformation of the physical structure can depend on various factors in different implementations of this description. Examples of such factors can include, but are not limited to the technology used to implement the storage media of storage system 630 and whether the computer-storage media are characterized as primary or secondary storage. For example, if the computer-storage media are implemented as semiconductor-based memory, software 640 can transform the physical state of the semiconductor memory when the program is encoded therein. For example, software 640 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A system comprising:
a plurality of data storage systems, each of the plurality of data storage systems comprising:
a plurality of non-transitory data storage devices; and
a network switch connected to each of the plurality of non-transitory data storage devices;
a distributed file system node connected to each of the plurality of data storage systems and comprising a processor and a memory storing instructions which when executed by the processor cause the processor to:
receive a request from a client device to perform an operation;
convert the request into a command that identifies one of the plurality of data storage systems to fulfil the request; and
transfer the command to the network switch of the identified one of the plurality of data storage systems,
wherein, upon receiving the command, the network switch broadcasts the command to each of the plurality of non-transitory data storage devices associated with the identified one of the plurality of data storage systems without uniquely identifying a specific one of the plurality of non-transitory data storage devices for fulfilling the request; and
wherein the processor of the distributed file system node receives an acknowledgement from one or more of the plurality of non-transitory data storage devices that fulfil the request.

2. The system of claim 1, wherein the distributed file system node identifies the one of the plurality of data storage systems to fulfil the request by identifying a broadcast network address for the one of the plurality of data storage systems.

3. The system of claim 1, wherein:
the request comprises a read operation to read data from one of the plurality of non-transitory data storage devices; and
upon receiving a read command via the network switch associated with the one of the plurality of non-transitory data storage devices, the one of the plurality of non-transitory data storage devices transfers the data from the one of the plurality of non-transitory data storage devices to the distributed file system node.

4. The system of claim 3, wherein the distributed file system node transfers the data to the client device.

5. The system of claim 1, wherein the request is a write operation for writing data to one of the plurality of non-transitory data storage devices, and wherein the command comprises the data that is to be written to the one of the plurality of non-transitory data storage devices.

6. The system of claim 1, wherein upon receiving the command from the network switch, the one or more of the plurality of non-transitory data storage devices that fulfil the request accept the command based upon satisfaction of one or more criteria before fulfilling the request.

7. The system of claim 1, wherein: the distributed file system node maintains a data structure for correlating information from the request to a broadcast network address of the one of the plurality of data storage systems to fulfil the request.

8. The system of claim 1, wherein the command does not identify the one or more of the plurality of non-transitory data storage devices that fulfil the request.

9. A system comprising:
a plurality of data storage systems, each of the plurality of data storage systems comprising:
a plurality of non-transitory data storage devices organized into one or more virtual local area networks; and a network switch connected to each of the plurality of non-transitory data storage devices;

a distributed file system node connected to each of the plurality of data storage systems and comprising a processor and a memory storing instructions which when executed by the processor cause the processor to:

receive a request from a client device to perform an operation;

convert the request into a command that identifies one of the plurality of data storage systems to fulfil the request; and transfer the command to the network switch of the identified one of the plurality of data storage systems, wherein, upon receiving the command, the network switch broadcasts the command to all of the plurality of non-transitory data storage devices having a first virtual local area network for fulfilling the request without identifying a specific one of the plurality of non-transitory data storage devices.

10. The system of claim 9, wherein the request is a read operation or a write operation, wherein the read operation is for reading data from one of the plurality of non-transitory data storage devices having the first virtual local area network, and wherein the write operation is to write the data to the one of the plurality of non-transitory data storage devices having the first virtual local area network.

11. The system of claim 9, wherein the distributed file system node maintains a data structure for identifying a broadcast network address of the one of the plurality of data storage systems based upon the request.

12. The system of claim 9, wherein the processor of the distributed file system node receives an acknowledgement from one or more of the plurality of non-transitory data storage devices that fulfil the request.

13. The system of claim 9, wherein:

the network switch that receives the command does not broadcast the command to the plurality of non-transitory data storage devices that have a second virtual local area network.

14. The system of claim 13, wherein each of the plurality of non-transitory data storage devices having the first virtual local area network that receives the command:

determines, based on one or more criteria, whether the command is to be accepted; and in response to determining that the command is to be accepted, sends an acknowledgement message to the network switch.

* * * * *